United States Patent [19]

Heller et al.

[11] Patent Number: 5,175,193

[45] Date of Patent: Dec. 29, 1992

[54] PROCESS FOR THE PREPARATION OF WEAKLY ACID CATION EXCHANGE RESINS

[75] Inventors: Harold Heller, Cologne; Friedrich Werner, Roesrath-Forsbach; Alfred Mitschker, Odenthal-Holz, all of Fed. Rep. of Germany; Herbert V. Diehl, Greensboro, N.C.; Axel Schäfer, Belford Roxo/Nova Ignazu, Brazil

[73] Assignee: Bayer Aktiengesellschaft, Leverkusen, Fed. Rep. of Germany

[21] Appl. No.: 638,465

[22] Filed: Jan. 7, 1991

Related U.S. Application Data

[63] Continuation-in-part of Ser. No. 544,456, Jun. 27, 1990.

[30] Foreign Application Priority Data

Jul. 6, 1989 [DE] Fed. Rep. of Germany ....... 3922201

[51] Int. Cl.⁵ .......................... C08F 8/12; C08F 20/44
[52] U.S. Cl. ........................................ 521/31; 521/25; 521/30; 521/38; 525/329.1; 525/329.2; 525/329.3; 525/369; 526/317.1
[58] Field of Search ...................... 521/31; 525/329.3; 526/317.1

[56] References Cited

U.S. PATENT DOCUMENTS 3,544,488 12/1970 Corte ............................... 525/329.3
4,614,751 9/1986 Chonde ................................ 521/31

Primary Examiner—Joseph L. Schofer
Assistant Examiner—Fred Zitomer
Attorney, Agent, or Firm—Sprung Horn Kramer & Woods

[57] ABSTRACT

The invention relates to an environment-friendly process for the preparation of weakly acid cation exchange resins by hydrolysis of crosslinked acrylonitrile bead polymers with an alkaline hydrolizing agent at elevated temperature, according to which the bead polymer and alkaline hydrolizing agent are brought together at elevated temperature only.

6 Claims, No Drawings

PROCESS FOR THE PREPARATION OF WEAKLY ACID CATION EXCHANGE RESINS

This patent application is a continuation-in-part application of parent application Ser. No. 544,456, filed Jun. 27, 1990 now pending.

The invention relates to a new environment-friendly process for the preparation of weakly acid cation exchange resins by hydrolysis of crosslinked acrylonitrile bead polymers.

Weakly acid cation exchange resins based on crosslinked polyacrylic acid and their preparation by acid or alkaline hydrolysis of crosslinked acrylonitrile bead polymers are known (see for example, Ullmanns Enzyklopädie der technischen Chemie (Ullmann's Encyclopaedia of Industrial Chemistry), 4th edition, Volume 13, page 301; U.S. Pat. No. 2,885,371, East German Patent Specification 79,584 and German Patent Specification 1,595,700).

The preparation of the weakly acid cation exchange resins by acid hydrolysis has the disadvantage that the hydrolysis, which proceeds with vigorous evolution of heat, is difficult to control in batches on an industrial scale, and that large amounts of waste sulphuric acid containing ammonium sulphate are obtained during the hydrolysis. These salt-containing sulphuric acids have to be worked up; working up is associated with considerable technical expenditure. Because of these disadvantages, acid hydrolysis has not found acceptance in practice.

Compared with acid hydrolysis, alkaline hydrolysis has the disadvantage that the ammonia formed during the hydrolysis can be recovered and is not obtained as ammonium sulphate which pollutes the environment. The alkaline hydrolysis is carried out using aqueous, alcoholic or aqueous-alcoholic 5 to 45% strength alkali metal hydroxide solution and is in general performed in a manner such that the suspension of the crosslinked polyacrylonitrile bead polymer to be hydrolysed (in the swollen or non-swollen state) is heated at temperatures of 60° to 170° C. in the alkaline hydrolysing agent, while stirring, either under reflux or alternatively in closed reaction vessels (autoclaves), and the mixture is stirred at this temperature until the hydrolysis has ended. However, this alkaline hydrolysis is associated with safety risks similar to those of acid hydrolysis. The alkaline hydrolysis also proceeds with vigorous evolution of heat and the ammonia is released not uniformly but in bursts.

There was therefore the object of discovering an economic process for the alkaline hydrolysis of crosslinked polyacrylonitrile bead polymers which is acceptable from the safety point of view and environment-friendly, and which moreover produces weakly acid cation exchange resins which have a high mechanical and osmotic resistance, a high purity and a high usable capacity.

Surprisingly, it has been found that such a process is achieved if instead of, as previously, mixing the acrylonitrile bead polymer to be hydrolysed and the alkaline hydrolysing agent with one another before the start of the hydrolysis and then heating this mixture, that is to say the suspension of the bead polymer in the alkaline hydrolysing agent, at the desired hydrolysis temperature, the two reaction partners are first combined with one another at the hydrolysis temperature according to the rate at which heat and ammonia are evolved, for example by initially introducing one reaction partner, that is to say the alkaline hydrolysing agent or bead polymer, into the reaction vessel, heating it to the desired hydrolysis temperature and then introducing the second reaction partner, while stirring, or by metering both reaction partners simultaneously into a reaction vessel which has been heated up to the desired hydrolysis temperature.

Surprisingly, it has been found that when the reaction partners are brought together at elevated temperature, the hydrolysis of the nitrile groups to give the carboxyl groups starts spontaneously and is not linked to the presence of certain excesses of the hydrolysing agent, and that the rate of reaction and therefore also the evolution of ammonia and heat can be controlled by the rate at which the two reaction partners are combined. It has been found that the rate of hydrolysis and therefore of evolution of ammonia and heat can be adjusted as desired by combining, according to the invention, the reaction partners at elevated temperature, and the hydrolysis can thus also be carried out on an industrial scale without a safety risk.

The invention therefore relates to a process for the preparation of weakly acid cation exchange resins, that is to say cation exchange resins containing carboxyl groups, by hydrolysis of crosslinked acrylonitrile bead polymers with an alkaline hydrolysing agent at elevated temperature, which is characterized in that the bead polymer and alkaline hydrolysing agent are brought together at elevated temperature only.

In addition to having the advantage described above of a safe reaction procedure, the process according to the invention has the advantage that the resulting weakly acid cation exchange resins not only have an excellent mechanical and osmotic resistance and a high usable capacity, but also—in contrast to the weakly acid cation exchange resins obtained by the known processes of alkaline hydrolysis—are practically free from low molecular weight organic compounds (unreacted monomers and non-polymerizable compounds contained in the monomers), that is to say are very pure, so that separate purification of the weakly acid cation exchangers present after the hydrolysis is unnecessary.

The process according to the invention, that is to say the combining of the reaction partners at the envisaged reaction temperature, can be carried out in various ways:

Procedure 1:

The alkaline hydrolysing agent is added continuously, while stirring, to the aqueous suspension, which is contained in a reaction container and has been heated to the desired hydrolysis temperature, of the bead polymer to be hydrolysed;

Procedure 2:

The bead polymer to be hydrolysed is introduced (metered), while stirring, into the alkaline hydrolysing agent, which is contained in a reaction container and has been heated to the desired hydrolysis temperature;

Procedure 3:

The bead polymer to be hydrolysed and the alkaline hydrolysing agent are simultaneously metered continuously, while stirring, into a reaction container which has been heated to the desired hydrolysis temperature, or into water which has been initially introduced into this reaction container and has been heated to the desired reaction temperature.

Process variant 1 is particularly simple in its process technology and apparatus. Surprisingly, it has been found that in this process variant the evolution of heat already practically ceases after addition of 25 to 50 mol % of the calculated amount of hydrolysing agent (based on the amount of nitrile groups to be hydrolysed), and heat then has to be supplied in order to maintain the desired reaction temperature. It is thus possible to add the remaining amount of the hydrolysing agent at an increased rate. This accelerated addition leads to a considerable increase in the space/time yield. The process variant 1 is therefore preferred.

The ammonia formed during the hydrolysis, that is to say while the reaction components are brought together, is distilled off together with water, if appropriate under increased pressure and obtained as concentrated ammonia solution using suitable devices, for example washers. After the reaction components have been brought together, removal of the ammonia by distillation is continued until no further ammonia passes over.

Any desired aqueous, alcoholic or aqueous-alcoholic solutions of alkali metal hydroxides and alkaline earth metal hydroxides can be employed as the alkaline hydrolysing agent; aqueous alkali solutions, such as potassium hydroxide solution and in particular sodium hydroxide solution, are preferably used.

In order to achieve as complete as possible a reaction of the nitrile groups in the shortest possible time, the amount of alkali is preferably chosen so that the concentration of alkali in the aqueous phase when the bringing together of the two reaction partners has ended is 5 to 40% by weight, preferably 10 to 30% by weight, and the alkali excess, based on the amount of nitrile groups to be hydrolysed, is 10 to 300 mol %, preferably 100 to 250 mol %.

In order to achieve as complete as possible a reaction of the nitrile groups in the shortest possible time, it is advantageous to carry out the process in the temperature range from 105° to 200° C., preferably in the range from 110° to 170° C., if appropriate by reducing the excess pressure.

It has proved particularly appropriate to use aqueous 15 to 25% strength by weight sodium hydroxide solution as the alkaline hydrolysing agent in the process according to the invention and to carry out the hydrolysis at temperatures of 125° to 160° C. Under these hydrolysis conditions, 90 to 95% conversion of the nitrile groups (degree of hydrolysis) is already achieved within 4 to 5 hours when acrylonitrile bead polymers crosslinked with up to 10% by weight of polyvinyl compounds are used.

The crosslinked acrylonitrile bead polymers to be hydrolysed according to the invention are copolymers of A. from 80 to 98, preferably from 85 to 95, % by weight of monoethylenically unsaturated monomer and B. from 20 to 2, preferably from 15 to 5, % by weight of ethylenically poly-unsaturated crosslinking agent, the above percentages being based on the sum A+B, with the proviso that monomer A comprises (i) at least 70% by weight (based on monomer A) of acrylonitrile, (ii) from 2 to 0% by weight (based on monomer A) of acrylic and/or methacrylic acid $C_1$-$C_4$-alkyl ester, and (iii) the balance (based on monomer A) of monoethylenically unsaturated monomer other than (i) and (ii).

Preferred monomers A consist essentially of acrylonitrile. Preferred monomers A (ii) include, for example, methyl acrylate, ethyl acrylate, n-butyl acrylate and the corresponding methacrylic acid esters, whereas monomers A (iii) include styrene, ethyl styrene, vinyl toluene and vinyl acetate.

Preferred crosslinking agents B include compounds having preferably two or three ethylenically unsaturated groups, particularly aromatic compounds such as, for example, divinyl benzene and trivinyl benzene, aliphatic and cycloaliphatic compounds such as, for example, hexa-1.5-diene, 2.5-dimethyl-hexa-1.5-diene, octa-1.7-diene and 1.2.4-trivinyl-cyclohexane or mixtures thereof. The compounds can be gelatinous or have a macroporous structure. The process according to the invention is also suitable for the preparation of weakly acid cation exchange resins based on methacrylonitrile, chloroacrylonitrile, vinylidene cyanide or crotononitrile.

EXAMPLE

A suspension of 10 l of copolymer (obtained by bead polymerization of a mixture of acrylonitrile with 7.5% by weight of 61% strength divinylbenzene and 2% by weight of 1,7-octadiene) in 16 l of desalinated water is heated to 150° C., while stirring, in a 50 l V4A stirred container fitted with a heating jacket, stirrer, thermometer and pressure control valve. When the temperature is reached, 4.0 kg of 45% strength by weight of aqueous sodium hydroxide solution (=49 mol %, based on the nitrile groups employed) are pumped into the container in the course of 100 minutes under an internal pressure of 4.8 to 5 bar, gentle cooling being necessary during the first 90 minutes in order to keep the internal temperature constant at 148° to 152° C. The remaining 13.5 kg of 45% strength by weight sodium hydroxide solution (=166 mol %, based on the nitrile groups employed) are then pumped in over a period of 40 minutes, it being necessary to heat the mixture gently to maintain the internal temperature of 150° C. At the same time, ammonia increasingly starts to distil off. When the addition of the sodium hydroxide solution has ended, the distillation of the ammonia is continued at 148° to 152° C. for about a further 3.5 hours. During this procedure, the internal pressure of the container is slowly lowered from 5 to 2.5 bar.

The ammonia distilled off is absorbed in a washer and collected as a 25% strength by weight aqueous solution. The column discharge is pumped back into the stirred container.

When the distillation of ammonia has ended and the mixture has cooled, the entire contents of the container are transferred to a washing tower; the reaction solution is allowed to drain through and the cation exchanger is rinsed with desalinated water. For conversion of the cation exchanger obtained in the sodium salt form into the H form, this exchanger is regenerated with 10% strength sulphuric acid and then washed with water until the runnings are neutral.

26.9 l of weakly acid cation exchange resin ($Na\oplus$ form) =18.9 l of weakly acid cation exchange resin ($H\oplus$ form) are obtained. The total capacity of the resin is 4.58 equivalents/l ($H\oplus$ form). The degree of conversion of the nitrile groups is 94.6 mol %; testing of the osmotic-mechanical stability resulted in 99% whole beads after 150 loading changes under 2.5 bar. In the purity test, for which 1,500 ml of the resulting cation exchanger in the $Na\oplus$ form was suspended in 1,000 ml of desalinated water and subjected to steam distillation, so that 200 ml of steam condensate were obtained per hour (duration of experiments 5 hours), no organic compounds, specifically naphthalene, were to be detected in any fraction (detection limit of the test for naphthalene: 1 mg/l).

5.85 kg of 25% strength aqueous ammonia solution were also obtained.

Weakly acid cation exchangers of the same quality are likewise obtained in the same amount if the bead polymer and sodium hydroxide solution are brought together at elevated temperature as follows:

a) 17.5 kg of 45% strength by weight aqueous sodium hydroxide solution are heated to 150° C. in a stirred container and the suspension, contained in a second stirred container, of 10 liters of the bead polymer described in 16 liters of desalinated water is then introduced continuously into this solution at the same temperature in the course of 4 hours by means of a metering screw;

b) 10 liters of desalinated water are heated to 150° C. in a stirred container and 17.5 kg of 45% strength by weight aqueous sodium hydroxide solution (via a metering pump) and the suspension of 10 liters of the bead polymer described in 6 liters of desalinated water (via a metering screw) are then simultaneously introduced continuously, from separate containers, into this water at temperatures of 148° to 150° C. in the course of 4 hours.

The ammonia is distilled off and the hydrolysis mixtures are worked up as described above in both cases.

What is claimed is:

1. A process for the preparation of a weakly acid cation exchange resin by alkaline hydrolysis of a cross-linked acrylonitrile bead polymer prepared by polymerization of
    A. from 80 to 98% by weight of monoethylenically unsaturated monomer; and
    B. from 20 to 2% by weight of ethylenically polyunsaturated crosslinking agent;
   the above percentages being based on the sum A+B; with the proviso that monomer A comprises (i) at least 70% by weight (based on monomer A) of acrylonitrile (ii) from 2 to 0% by weight (based on monomer A) of acrylic and/or methacrylic acid $C_{1-4}$-alkyl ester, and (iii) the balance (based on monomer A) of monoethylenically unsaturated monomer other than (i) and (ii), said process comprising suspending cross-linked acrylonitrile bead polymer in alkaline hydrolysing agent at a temperature in the range of from 105° to 200° C. to effect hydrolysis and separating off the beads from the alkaline hydrolysing agent after the hydrolysis has ended.

2. The process of claim 1 wherein an aqueous alkali solution is used as the alkaline hydrolysing agent.

3. The process of claim 1 wherein the ammonia formed during the hydrolysis is continuously distilled off together with water.

4. Process according to claim 1 wherein the bead polymer and the alkaline hydrolysing agent are brought together at a temperature in the range of from 110° to 170° C.

5. The process of claim 1 wherein the bead polymer and the alkaline hydrolysing agent are brought together at the elevated temperature in a manner such that the alkaline hydrolysing agent is added continuously, while stirring, to the aqueous suspension, which is contained in a reaction container and has been heated to the desired hydrolysis temperature, of the bead polymer to be hydrolysed.

6. The process of claim 1 wherein 15 to 25% strength by weight of aqueous sodium hydroxide solution is used as the hydrolysing agent and the reaction partners are brought together at a temperature in the range of from 125° to 160° C.

* * * * *